(12) United States Patent
Silverstein et al.

(10) Patent No.: US 6,781,069 B2
(45) Date of Patent: Aug. 24, 2004

(54) METHOD AND APPARATUS FOR VIRTUAL INTERACTION WITH PHYSICAL DOCUMENTS

(75) Inventors: D. Amnon Silverstein, View, CA (US); Keith E. Moore, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 151 days.

(21) Appl. No.: 09/748,156

(22) Filed: Dec. 27, 2000

(65) Prior Publication Data

US 2002/0079143 A1 Jun. 27, 2002

(51) Int. Cl.[7] .............................................. G06R 11/06
(52) U.S. Cl. .................................... 178/18.01; 358/473
(58) Field of Search ............................... 345/859–861, 345/629, 632, 634, 667, 671; 178/18.01, 18.03, 18.09, 18.11, 26.1; 704/2, 3, 7; 358/473, 474; 382/313

(56) References Cited

U.S. PATENT DOCUMENTS

| | | | | |
|---|---|---|---|---|
| 4,930,888 A | * | 6/1990 | Freisleben et al. | .......... 356/152 |
| 5,557,301 A | * | 9/1996 | D'Aviau de Poilant | ..... 345/179 |
| 5,638,523 A | * | 6/1997 | Mullet et al. | ................ 395/326 |
| 5,848,373 A | * | 12/1998 | Delorme et al. | ............ 701/200 |
| 5,959,605 A | | 9/1999 | Gilblom | |
| 6,208,435 B1 | * | 3/2001 | Zwolinski | .................... 358/473 |
| 6,240,360 B1 | * | 5/2001 | Phelan | ........................ 701/208 |
| 6,288,702 B1 | * | 9/2001 | Tachibana et al. | .......... 345/130 |

FOREIGN PATENT DOCUMENTS

| | | |
|---|---|---|
| EP | 0405826 | 1/1991 |
| EP | 0462013 | 12/1991 |
| WO | WO9116771 | 10/1991 |

* cited by examiner

*Primary Examiner*—Kent Chang
*Assistant Examiner*—Tommy Sheng

(57) ABSTRACT

The present invention is directed to enhancing a user's interaction with a physical document, such as a page of a book, by supplying the user with additional information related to the physical document in a simple, easy to use fashion. Exemplary embodiments provide this additional information as digital content that is displayed as an overlay upon the document. The overlay can be in the form of a flat digital display that can be moved about a surface of the physical document. The absolute position of the movable display is tracked, so that digital content presented on the display is related to a particular position of the display over the document. This capability can be exploited to, for example, provide an on-the-fly translation of a particular document, with the translation being provided as the movable display is scanned over the words printed on a document to be translated.

21 Claims, 3 Drawing Sheets

METHOD AND APPARATUS FOR VIRTUAL INTERACTION WITH PHYSICAL DOCUMENTS

BACKGROUND OF THE INVENTION

1. Field of the Invention

The present invention relates generally to displaying information of a database, and more particularly, to displaying information from a database which can be correlated to a particular physical document.

2. Background Information

Numerous available products are directed to the interaction of physical documents, such as books, with digital information. For example, scanners are known which permit physical documents to be digitized so that a user can interact electronically with the document. It is also known to include bar codes on physical documents which can be scanned by a bar code reader. The bar code reader can be connected with a database, and used to access and display information related to the document.

One such scanner is a hand-held Universal Product Code (UPC) reader available from RadioShack Corporation of Fort Worth, Tex. which can be used to swipe a UPC code or label and, as a result, view information about a related product from the World Wide Web via an associated computer monitor. The product code can be included on a physical document, such as an advertising brochure or catalog.

Other devices which provide for digital interaction with a physical document include graphics tablets, such as those available from Kurta Inc. These tablets constitute flat surfaces upon which a user places a physical document. Afterwards, the user can move a "stylus/pen" or "puck" representing a cursor associated with the graphics tablet about the document (e.g., about a drawing on the document), to trace the document and thereby create a digital version of the document. The tablet tracks the absolute position of the stylus, as opposed to merely detecting the more traditional relative position associated with, for example, movement of a mouse over a mouse pad. The resultant motions of the stylus can thus be translated into the creation of digital images on a computer monitor.

Although numerous devices for interacting with physical documents exist, there is a need for developments which can simplify this interaction, and enhance the ease with which information related to the physical document can be presented to the user.

SUMMARY OF THE INVENTION

The present invention is directed to enhancing a user's interaction with a physical document, such as a page of a book, by supplying the user with additional information related to the physical document in a simple, easy to use fashion. Exemplary embodiments provide this additional information as digital content that is displayed as an overlay upon the document. The overlay can be in the form of a flat digital display that can be moved about a surface of the physical document. The absolute position of the movable display is tracked relative to a document, so that digital content presented on the display is related to a particular position of the display over the document. This capability can be exploited to, for example, provide an on-the-fly translation of a particular document, with the translation being provided as the movable display is positioned over the words printed on a document to be translated.

Generally speaking, the present invention is directed to an apparatus and associated method for displaying information. According to exemplary embodiments, the apparatus is configured as a movable display comprising: means for detecting an absolute position of the movable display relative to a surface of a first document; and means for correlating the absolute position of the movable display to information stored in a database, and for presenting the information on the movable display. Exemplary embodiments permit a user to interact with a physical document to access and manipulate related digital content.

DESCRIPTION OF THE DRAWINGS

The present invention will now be described by way of exemplary embodiments to which it is not limited as illustrated in the following drawings.

DETAILED DESCRIPTION OF THE PREFERRED EMBODIMENTS

Figure 1:
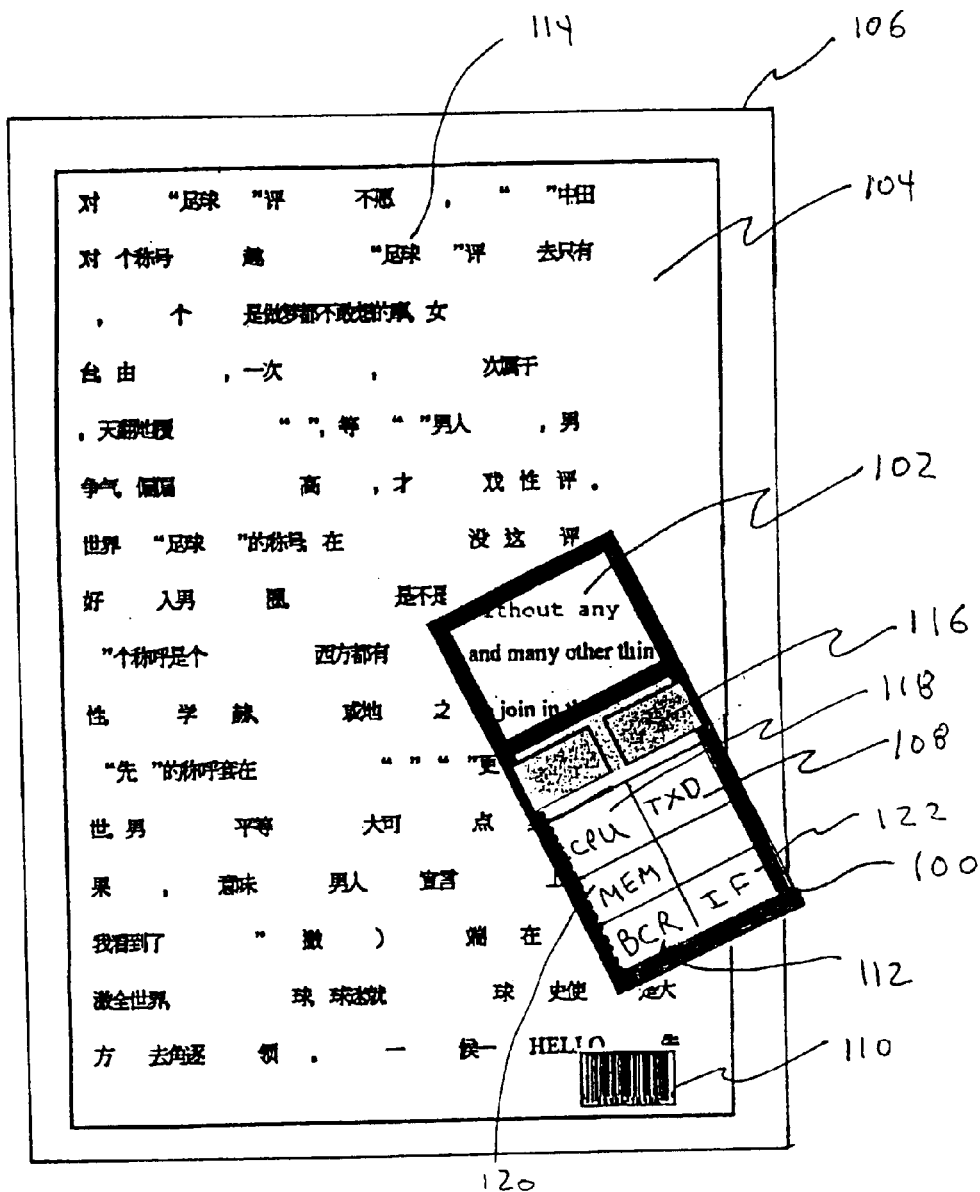
FIG. 1 shows an overview of an exemplary embodiment of the present invention.

FIG. 1 shows an apparatus, represented as a movable display 100, for displaying information in accordance with exemplary embodiments of the present invention. The movable display 100 has a display screen 102, and can be configured similar to the hand held display apparatus available as the Jornada 540 series from Hewlett Packard. This display apparatus includes a flat screen housed in the case, and can include a thumb wheel for magnifying and/or reducing the magnification of a displayed image. Such a feature can be used in accordance with exemplary embodiments of the present invention to control the size of an image, and thus, the portion of a physical document correlated to the display screen 102.

The display apparatus is further configured in accordance with the FIG. 1 embodiment with means for detecting an absolute position of the movable display relative to a surface of the first document, such as a physical (e.g., paper) document 104. The physical document 104 can be a sheet of paper, a page from a book, or any flat surface.

In one embodiment, the absolute position detecting means can be configured using a graphics tablet 106 such as any readily available graphics tablet known to those skilled in the art. These tablets typically have an active area specified with respect to a display, with absolute motion of a pen or stylus being translated into movement of a cursor over the display. The movements of the pen/stylus can be detected even when the pen/stylus is spaced a limited distance from the surface of the tablet. These tablets are available from such manufacturers as ACECAD Inc., Wacom Inc., HITACHI Inc., and Kurta Inc.

The exemplary movable display 100 can be configured to include a transducer 108, like that included in the pen/stylus of any available graphics tablet. The physical document 104 can be placed on the graphics tablet 106. By correlating the physical document to the active area of the graphics tablet 106, and by correlating the active area to the display screen 102, the absolute position of the movable display 100 can be determined relative to information presented on the physical document.

Of course, means can be provided to permit the movable display to initially determine which physical document is exposed on the graphics tablet. For example, each physical document can have an associated code (e.g., identification number) which the user can initially key into the movable display via a keyboard. Alternately, each physical document can include a barcode, such as barcode 110, that can be read by a barcode reader (BCR) 112 included in the movable display. Known image recognition systems, readily available, can also be used to identify a particular document. Upon determining what physical document is exposed on the graphics tablet and registering the physical document on the graphics tablet, the position of the display screen relative to the physical document can be used to access information from a database relative to the position of the physical document at which the display apparatus is presently located.

Registration of the document to the graphics tablet can be achieved in any of a number of ways readily apparent to those skilled in the art. For example, the physical document can be placed at a predetermined position relative to the active area of the graphics tablet (e.g., the upper left hand corner of the physical document can be placed in registration with the upper left hand corner of the active area of the graphics tablet). Alternately, the physical document can be placed at any position where portions of the physical document under consideration will overlay the active area of the graphics tablet. The movable display can include a registration button that can be activated (e.g., depressed) when the movable display has been positioned at a predetermined position of the physical document (e.g., an upper left hand corner of the physical document). In this embodiment, the predetermined positioning of the physical document is overlaid upon the active area of the graphics tablet so that absolute positions of the display relative to the predetermined position can be tracked as the display is moved about the surface of the document.

Of course, any number of such predetermined positions identified using any number of different techniques can be exploited. Those skilled in the art will appreciate that it is only necessary that the absolute position of the movable display relative to the surface of the physical document be ascertainable.

Having provided means to detect an absolute position of the movable display relative to a surface of a first document, this positional information can be used to access information relative to the position for presentation on the display screen 102. Accordingly, the exemplary movable display 100 of FIG. 1 includes means, such as a processor (CPU) 118 and associated memory 120, for correlating the absolute position of the movable display to information stored in a database, and for presenting information on the movable display. In a sense, the movable display serves as a pointing device, which allows the user to point to a given location on the physical document, and to access information from a remote location that is relative to that point on the physical document.

For example, the processor and associated memory included in the readily available Jornada 540 series device, or any other suitable processor and memory, can be used to translate absolute position coordinates of the movable display into database addresses, URL addresses, or any other desired link to information stored elsewhere. Information available at a link associated with a particular point on the physical document can be accessed and retrieved for display on display screen 102. The information can include text based information, numeric information, graphical information, or any combination thereof. The information can include access to blocks of information, such as a web page, which can then be further explored using keys or buttons included on the movable display 100. For example, the user, having access to a particular web page based on a positioning of the movable display, can use keys included on the movable display to move about the web page, and to access other web pages.

Assume, for example, that the physical document placed on the graphics tablet is a page of a Japanese text containing Japanese characters 114 as shown in FIG. 1. Having registered the position of the movable display to the physical document, the absolute position of the movable display over the document can be determined and tracked as the display is moved about the document. This positional information can be correlated to a database or Internet site which includes a translation of the document into English, or into any number of different languages that can be selected by the user, in response to activation of a particular button on an interface associated with the movable display 100. Because different positions on the document will include different Japanese characters, the positional information associated with the movable display can be correlated to an address at which a translation of a given set of Japanese characters located beneath the current position of the display screen 102 exists.

Exemplary embodiments can accommodate the translation in any desired fashion. That is, while it would be easy to overlay English words on their German language equivalents, the invention can also be adapted to more complex situations, such as situations where there may not be such a direct correlation (e.g., as with a translation of Japanese text into English). That is, exemplary embodiments can be configured to provide a correlation of a movable display position to any desired output information in any desired form.

To ensure that all Japanese characters beneath the display screen will be properly translated, and that the translated words will be oriented on the display relative to their counterparts on the physical document in a manner desired by the user, the exact orientation of the display relative to the physical document can be detected. This can be achieved, for example, by tracking enough positional coordinates of the movable display 100 that the orientation of the display screen relative to the document 104 can be determined.

As the display screen 102 is moved over the physical document, the database can be repeatedly accessed in real time to update the display screen, and provide an on-the-fly translation of Japanese words appearing immediately beneath the display screen for any given position of the display screen. In a sense, the display screen acts as a "lens" or magnifying glass to present a translation or enlargement/reduction of the physical document to the user as the "lens" is moved about the surface.

The exact manner in which the information is displayed, can of course, be altered in any number of ways too numerous to mention here, but readily apparent to those skilled in the art. Similarly, the exact presentation can be altered in any number of ways.

In alternate embodiments, buttons included on the movable display can be provided to permit any of a variety of functions. For example, buttons 116 can be included to permit magnification/reduced magnification of the displayed image as was already mentioned. Similarly, buttons can be included to permit rotation of the displayed image, to control color of the displayed image, font of the displayed text, or to alter any other characteristics of the displayed text, numeric, audio, tactile or graphical information. Buttons can be provided to further access additional information associated with the displayed imagery. For example, in the context of the FIG. 1 example, wherein a translation of Japanese text is displayed, buttons included on the movable display, can be used to access dictionary definitions of words in the displayed image, to link to other addresses of interest, and so forth.

The movable display can access information via an onboard database, and in this sense, can be completely self contained. Alternately, to provide increased flexibility, the movable device can include a wired or wireless link to a remote database, such as a web site included on the World Wide Web, accessed, for example, via an interface 122 which communicates with a desktop computer or server. Such an interface is well known and need not be described herein in detail.

Figure 2:
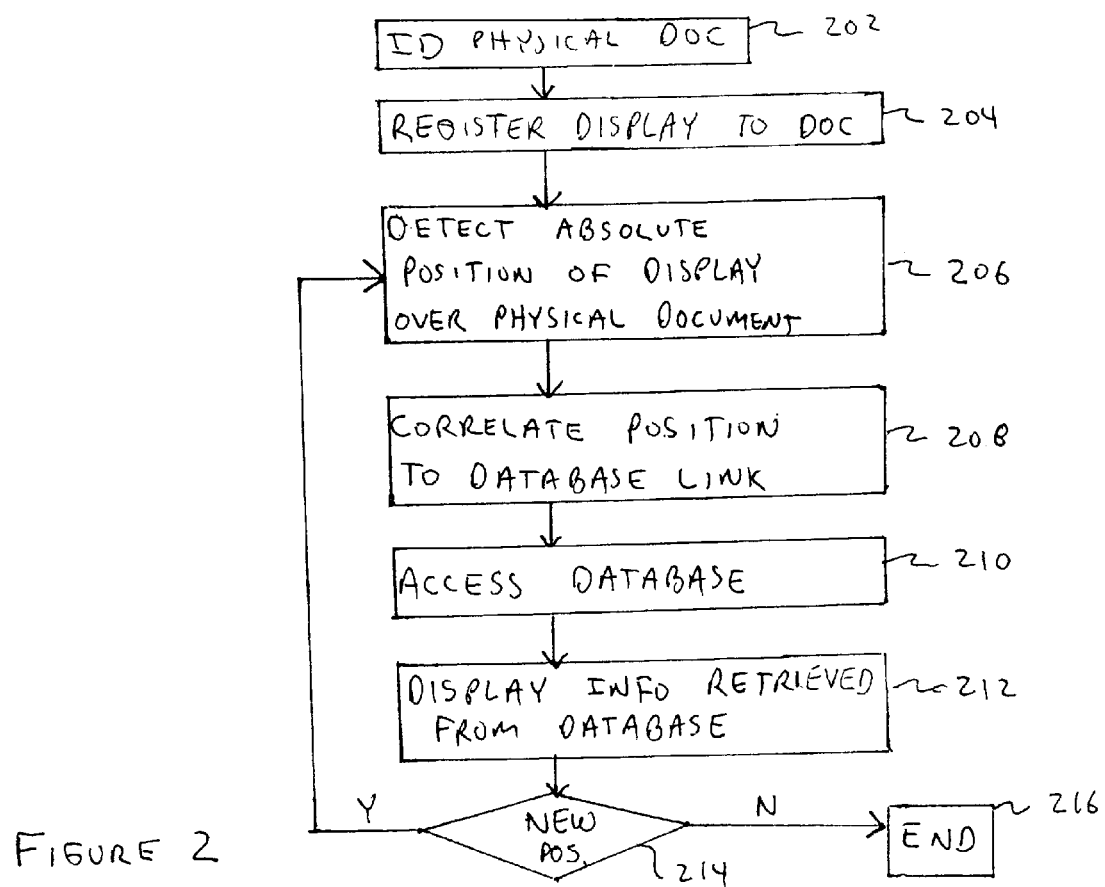
FIG. 2 shows an exemplary flowchart of operation associated with the FIG. 1 movable display.

FIG. 2 shows an exemplary flow chart for the processes carried out by the processor 118 of the exemplary FIG. 1 movable display 100. In step 202, the physical document is identified using, for example, some identification number, barcode or other document identification technique. In step 204, the movable display is registered to the physical document so that absolute positions of the movable display can be tracked as the movable display is relocated about a surface of the physical document. Again, this registration can be achieved by, for example, moving the movable display to a fixed position on the physical document, and activating one of the buttons 116 on the movable display to establish a (0,0) coordinate position.

In step 206, the absolute position of the movable display is detected for any given position of the movable display over the document. In step 208, the absolute position detected either by a sensor included in the graphics tablet 106, or via the output from the transducer 108 associated with the movable display, is correlated to a database link. In an exemplary embodiment, the onboard transducer 108 produces output information representing the coordinate position of the movable display over a surface of the document. Using a look-up table associated with memory 120, the movable display correlates this coordinate position information to an address (i.e., using an indirect address technique). The CPU 118 of the movable display 100 then accesses a database in step 210. Again, the database can either be an onboard database, or can be a database accessed through either a wired or wireless link of the interface 122 to another computer, or to a server. For example, the database can be accessed over the Internet.

In step 212, the information from the database is retrieved and forwarded to the display screen 102 of the movable display. In step 214, the on-board processor determines whether the movable display has been repositioned based on outputs from the transducer 108. If so, a new absolute position of the display is detected in step 206, and the display screen 102 updated accordingly. Alternately, if the display has not been repositioned, then the display screen retains the information previously displayed, and operation proceeds to the END block 216 until further movement of the movable display reactivates the sequence of steps beginning with step 206.

The foregoing embodiments are by way of example only, and numerous alternate embodiments will be readily apparent to those skilled in the art. For example, it is not necessary to detect an absolute position of the movable display 100 using a graphics tablet which interacts with a transducer included on the movable display. In an alternate embodiment, the absolute position can be detected by monitoring the position of the movable display using any known detection technique including, but not limited to, use of a passive board in conjunction with a movable display that, via a wired or wireless link, transmits positional information (e.g., via an infrared link). The positional information can be output using any known position detection system.

In alternate embodiments, tracking marks can also be established (e.g., printed, formed or embedded) on/in a transparent/semi-transparent sheet that is placed over the document. The marks can be any visible marks and/or can be invisible, for example ultraviolet (UV), polarization, microprinting, gloss differences, conductivity changes, dielectric strengths, tactile bumps, or any other discernible type of marking. The transparent sheet can be used over and over with any document.

Figure 3:
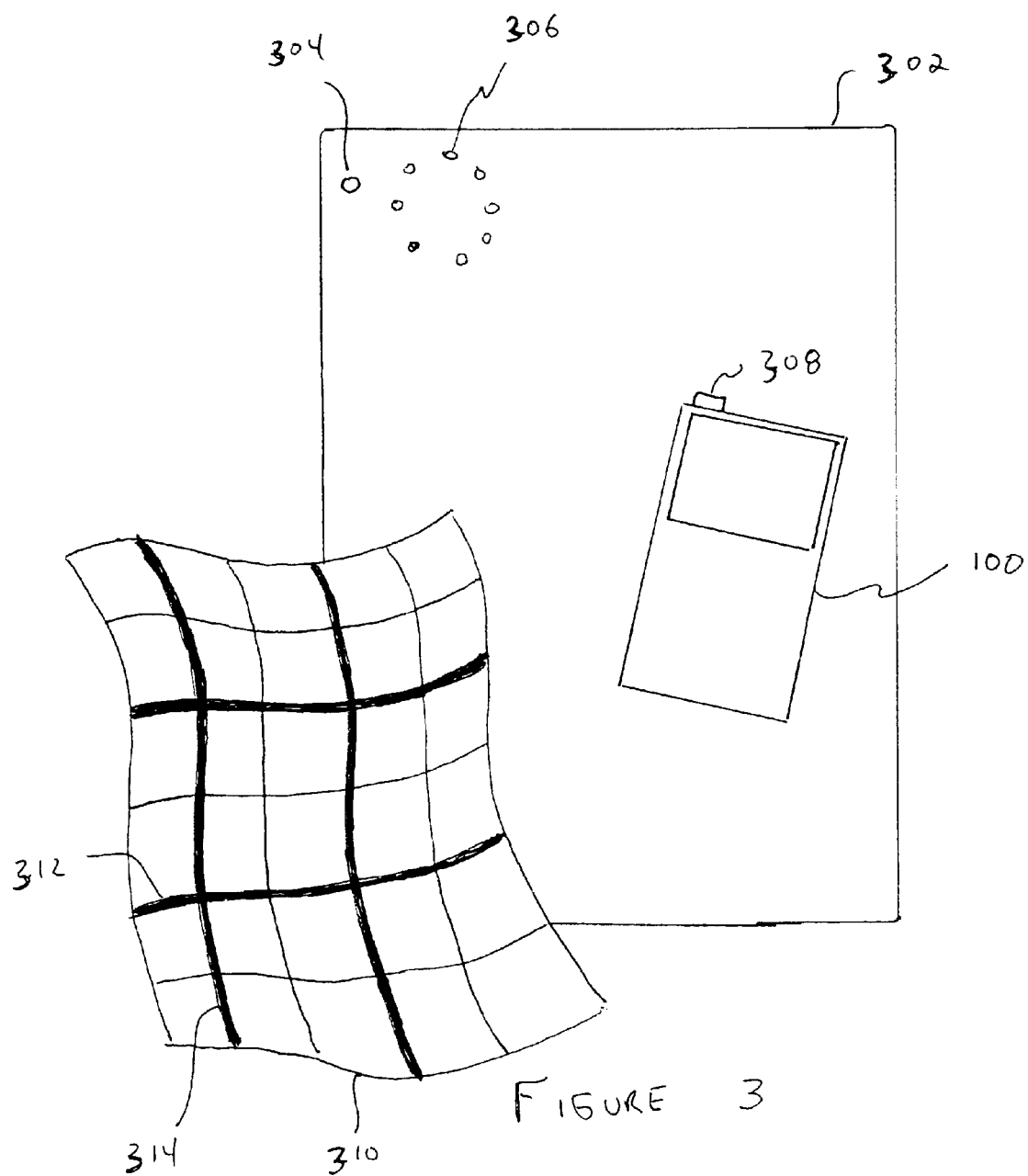
FIG. 3 shows alternate embodiments of the present invention.

Other known techniques for detecting an absolute position which can be used with the present invention include the known vortac radio navigation technique, which can be implemented using an infrared port on the movable display. More particularly, and by way of example, FIG. 3 shows a plurality of diodes 304/306 included on a passive tablet 302 at a fixed location. One of the diodes 304 can serve as a diode used to create a start pulse. The remaining diodes 306 can be configured in a circle, adjacent the single diode, and flash in sequence to form an electrical rotation. An infrared detector 308 included on the movable display 100 can sense the flash from the single diode as the start of a position detection operation. The arrangement of circular diodes can then sequentially emit flashes, and the detector on the movable display can sense when light from each of the diodes in the rotational sequence is detected. Based on the detection of the initial start pulse from the single diode 304, relative to the detection of a flash from each of the diodes arranged in the circle, the movable display can determine its orientation relative to the fixed diodes, and thus can ascertain a set of absolute position coordinates.

In accordance with an alternate embodiment, indicia written on or embedded in the physical document, such as physical document 310, can be used to detect an absolute position of the movable display. For example, the physical document can be printed in advance with a navigational grid of lines, such as alternating thick and thin lines. By initially correlating and registering the position of the movable device to a known position on the physical document, movements of the movable display 100 over the physical document can be tracked by monitoring the number of thick and thin lines detected. Changes in direction can be detected by optically monitoring whether the movable display is transitioning from a thin line to a thick line or vice verse. The thick and thin lines can be both horizontal lines 312 and vertical lines 314 to form a cross grid, with the proximity of adjacent lines to one another being spaced to achieve a desired resolution of position detection. Of course magnetic, fluorescent or infrared inks, or any other visible or invisible inks, or other indicia can be used as well.

Those skilled in the art will appreciate that as the display screen 102, any available display can be used. For example, any flat panel display, or any other display can be used. In addition, a touch sensitive display can be used, and can provide any functional attributes desired by the user. For example, the touch sensitive display can be configured to permit the user to magnify or reduce magnification of a particular portion of the displayed image. Thus, the touch sensitive display can be configured to include buttons for performing any of the functions described herein, or any additional functions apparent to those skilled in the art.

Those skilled in the art will also appreciate that while access to displayed imagery using the movable display 100 has been described herein, access can also be provided to audio databases to provide audio outputs corresponding to given positions of the movable display over the physical document. For example, in the FIG. 1 example of a Japanese language document, access to a database using the movable display 100 can result in an output of sound, representing either the original sounds in Japanese or the translated sounds. Those skilled in the art will appreciate that sounds associated with each of the characters can be stored in the database and simply accessed based on a "pointing" of the movable display at a particular location on the physical document. In addition, tactile outputs (e.g., mouse vibrations) could be provided as an exemplary form of tactile feedback based on the absolute position of the movable display over the document. For example, Logitech Corp. manufactures a mouse with a vibration capability that could be used in accordance with the present invention to provide such a feature.

Those skilled in the art will appreciate the exemplary embodiments of the present invention, by providing a "lens" for viewing information beyond the surface of a written, physical document, can provide access to a limitless database of related information relative to the physical document. In accordance with exemplary embodiments, a relatively small display affords a user an opportunity to view a much larger virtual work space related to the physical document.

Those skilled in the art will also appreciate that while exemplary embodiments of the present invention have been described in the context of connecting the movable display with a desktop computer, it can also be connected with any device, including but not limited to a laptop or notebook computer, a personal digital assistant (PDA), a wireless telephone, or any other desired device. Similarly, the movable display can be configured of any size desired by the user, and the exemplary embodiment of FIG. 1 is not limited to relative sizes as shown.

Those skilled in the art will also appreciate that exemplary embodiments of the present invention can be advantageously used to code and decode information. For example, where a physical document has been prepared with written indicia provided as a cryptographic representation, the movable display 100 can be used in conjunction with the physical document to access a database and display a non-cryptographic representation of the printed indicia. For example, a private/public key encryption mechanism can be used. In one instance, indicia written on the physical document can be prepared (e.g., encrypted) using a particular public and/or private key, and then decrypted by using the movable display that uses the public key and/or a private key known to the moveable display and/or the user. In the exemplary embodiment, the encrypted information on the document can be encrypted using a public key associated with the moveable display, and with a private key of the author. The moveable display can include a scanner to scan the information for transmission to a site where the scanned information is decrypted, and then re-encrypted using a private key associated with the moveable display. The re-encrypted data can be transmitted back to the moveable display where it is decrypted using the display's private key. Alternately, the moveable display can simply store a key to directly decrypt the information without accessing a remote database (e.g., where the data has not been encrypted using a private key of the author).

Although the present invention has been shown and described with reference to exemplary embodiments, it will be understood by those skilled in the art that various other changes in the form and details may be made therein without departing from the spirit and scope of the invention.

What is claimed is:

1. A movable display comprising:
   means for detecting an absolute position of the movable display relative to a surface of a first document; and
   means for correlating the absolute position of the movable display to information stored in a database, and for presenting information on the movable display.

2. Movable display according to claim 1, wherein the detecting means is a transducer included within the movable display.

3. Movable display according to claim 2, in combination with a graphics tablet, wherein the transducer interacts with the graphics tablet to provide absolute positional information of the movable display relative to an active area of the graphics tablet.

4. Movable display according to claim 1, in further combination with a passive tablet, wherein the movable display comprises:
   means for monitoring a position of the movable display relative to a fixed location on the passive tablet.

5. Movable display according to claim 4, wherein the monitoring means includes an infrared sensor for detecting signals from a fixed location using vortac radio navigation techniques.

6. Movable display according to claim 1, wherein the detecting means is configured to detect a position of the movable display relative to information which is at least one of printed on or embedded in the first document.

7. Movable display according to claim 1, wherein the correlating means includes:
   a processor and associated memory.

8. Movable display according to claim 7, wherein the database is stored in a memory on board the movable display.

9. Movable display according to claim 7, wherein the information is stored in a database remote from the movable display.

10. Movable display according to claim 9, wherein the information stored remote to the movable display is accessed via a wired link.

11. Movable display according to claim 9, wherein the information stored remote to the movable display is accessed via a wireless link.

12. Method for displaying information related to a physical document, comprising:
    detecting an absolute position of a movable display relative to a surface of a first document, as the movable display is moved about the surface of the first document;
    correlating the absolute position of the movable display to information stored in the database; and
    presenting the information on the movable display.

13. The method according to claim 12, wherein a transducer interacts with a graphics tablet to provide absolute positional information of the movable display relative to an active area of the graphics tablet.

14. The method according to claim 12, wherein the movable display monitors a position of the movable display relative to a fixed location on a passive tablet.

15. The method according to claim 12, wherein a position of the movable display is detected relative to information which is at least one of printed on or embedded in the first document.

16. The method according to claim 12, wherein the database is stored in a memory on board the movable display.

17. The method according to claim 12, wherein the information is stored in a database remote from the movable display.

18. The method according to claim 12, wherein the information is stored remote to the movable display and accessed via a wired link.

19. The method according to claim 12, wherein the information is stored remote to the movable display and accessed via a wireless link.

20. The method according to claim 12, wherein the first document includes information in a first language, and the movable display presents a translation of the information into a second language.

21. The method according to claim 12, wherein the first document includes encrypted information that can be decrypted by the moveable display.

* * * * *